Nov. 7, 1939.   K. VEY   2,179,107
WASH LINE COUPLING
Filed July 13, 1938
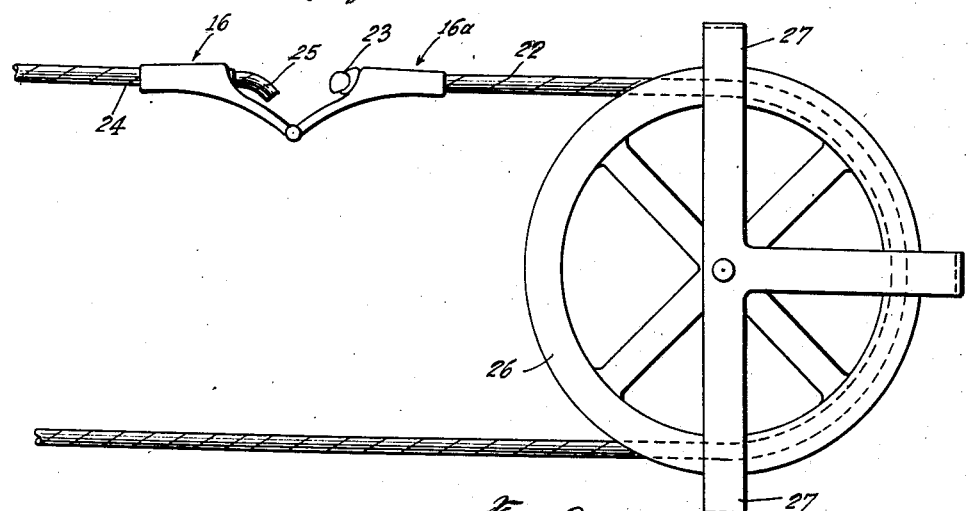
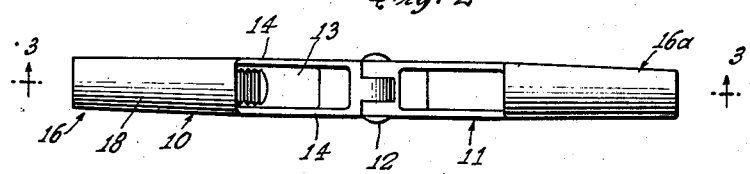
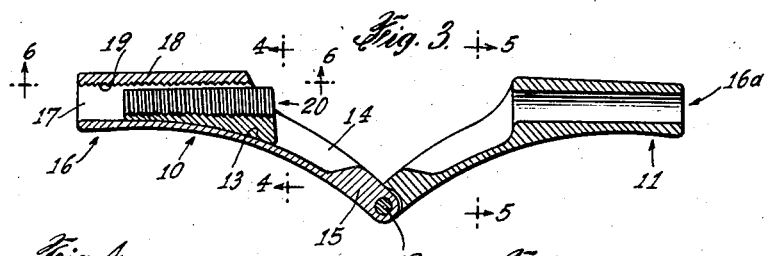
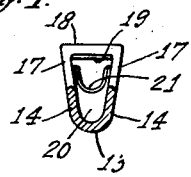
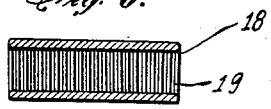
INVENTOR.
K. VEY
BY  F. Ledermann
ATTORNEY.

Patented Nov. 7, 1939

2,179,107

UNITED STATES PATENT OFFICE 2,179,107

WASH LINE COUPLING

Kurt Vey, Brooklyn, N. Y.

Application July 13, 1938, Serial No. 219,029

2 Claims. (Cl. 24—126)

The object of this invention is the provision of a coupling adapted to join the ends of a wash line to eliminate the usual tying of the ends together and at the same time to permit continuous passing of the entire length of line around the pulleys at the ends thereof.

The above and other objects will become apparent in the description below, in which characters of reference refer to like-named parts in the accompanying drawing.

Referring briefly to the drawing,

Figure 1 is a side elevational view of a wash line and pulley, showing the coupling in use.

Figure 2 is a plan view of the coupling of Figure 1 per se.

Figure 3 is a cross-sectional view taken on the line 3—3 of Figure 2.

Figure 4 is a cross-sectional view taken on the line 4—4 of Figure 3.

Figure 5 is a cross-sectional view taken on the line 5—5 of Figure 3.

Figure 6 is a cross-sectional view taken on the line 6—6 of Figure 3.

Referring in detail to the drawing, the numeral 10 represents one member and the numeral 11 the other, which are mutually hinged together at 12 to form the coupling. The members 10 and 11 are identical in form and shape, but differ slightly in details.

The member 10 comprises a circularly arched arm 13, concave in cross-section, having diverging side walls 14. Near the hinge 12 the space between the walls 14 is filled in, as at 15, to strengthen the coupling adjacent the hinge.

From a point intermediate the arm 13 to its outer extremity, a hollow sleeve 16 is formed integral with the arm, whose floor is a continuation of the floor of the arm 13 and of the same contour as the latter. The side walls 17 of the sleeve 16 are similarly continuous extensions of the side walls 14, and the sleeve 16 has a flat roof 18, having corrugations 19, extending tangentially rearward toward the hinge.

A wedge 20 is slidably insertable into the sleeve 16 from the rear. The wedge has a cylindrically concave top 21, which is also corrugated, and its bottom is circularly arched in side elevation at the same degree of curvature as that of the arm 13. The bottom of the wedge 16 is also convexly rounded in cross section, so that it registers in and is slidable along the concave floor of the arm 13.

The member 11 is identical to the member 10 with the exception that the former does not need to have the roof of its sleeve 16a corrugated.

In applying the coupling to a clothes line, one end 22 of the line is inserted through the sleeve 16a and a knot 23 is tied on its extremity to prevent the line from being pulled out of the sleeve. The other end 24 of the line is passed thorugh the sleeve 16 with a length 25 protruding therefrom sufficient to enable grasping of the protruding end in the fingers. The wedge 20, which has meanwhile been removed from the device, is then laid on the floor of the arm 13 at the hinge end of the latter, with its bottom registering in the said floor. The loose end 25 of the line is then held firmly while the wedge 20 is slid upward into the sleeve 16. It is obvious that as the wedge enters the sleeve 16 the line will be jammed between the corrugations of the roof 18 and the wedge, and the more the line is thereafter pulled from the left (Figure 1) the tighter its end 24 will be jammed between the wedge and the sleeve.

The circular contour of the arm 13, and hence of the arm of the member 11, is the same as that of a standard clothes line pulley 26. Hence, when the coupling rides around the pulley, the members 10 and 11 will bend around the hinge 12 to ride flush against the rim of the pulley and to clear the guides 27 on such pulleys as are equipped with guides. As the line stretches from continued use, it may be readily tautened by first removing or loosening the wedge 20, by pulling out an additional length of line by grasping the loose end 25, and jamming the wedge back home. Thus, not only does the coupling simplify the work of taking up a slack line, but it also permits use of both the upper and the lower loops of line for the purpose of hanging clothes therefrom.

If desired, both members 10 and 11 could be made identical, that is, of exactly the same construction and design as the member 10 and the member 11 in the case also provided with a wedge identical to the wedge 20. In this case it would be unnecessary to tie the knot 23, as that end of the rope 22 would be permanently clamped in the member 11.

Obviously, modifications in form and structure may be made without departing from the spirit and scope of the invention.

I claim:

1. A clothes line coupling comprising a pair of substantially identical members, said members being circularly arched and having each a sleeve on its outer end, the inner extremities of said members being pivotally joined to each other, said coupling normally simulating V-shaped with said members extending arcuately outward from said pivot.

2. A clothes line coupling comprising a pair of substantially identical members mutually hinged together, said members being circularly arched and having each a sleeve on its outer end, one of said members and said sleeve thereon having a continuous arcuate floor, said last-named member having a wedge slidably mounted in its said sleeve, the roof of said sleeve of said latter member being flat, said continuous arcuate floor being concave in cross section, the top surface of said wedge being concave in cross section, the bottom of said wedge being convex in cross section and registering slidably in said continuous arcuate floor.

KURT VEY.